Figure 1:
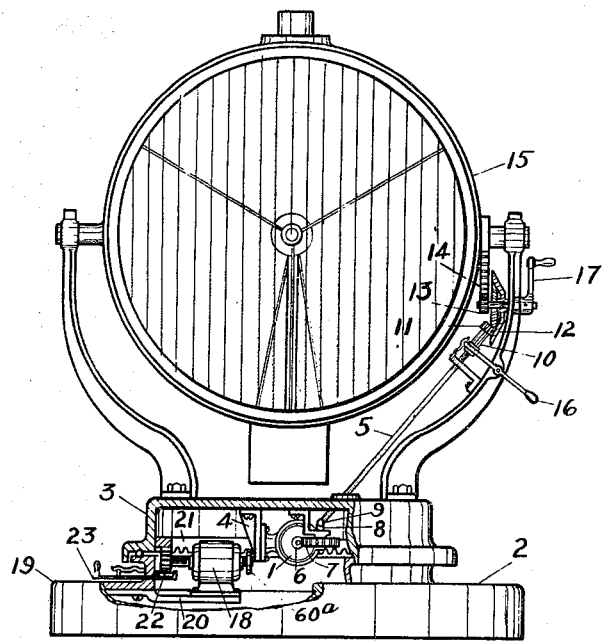

Sept. 1, 1925.

A. P. DAVIS 1,551,805

DISTANT CONTROL FOR SEARCHLIGHTS

Filed Jan. 4, 1917

2 Sheets-Sheet 1

INVENTOR
ARTHUR P. DAVIS.
BY
Herbert H. Thompson
ATTORNEY

Sept. 1, 1925.
A. P. DAVIS
1,551,805
DISTANT CONTROL FOR SEARCHLIGHTS
Filed Jan. 4, 1917
2 Sheets-Sheet 2
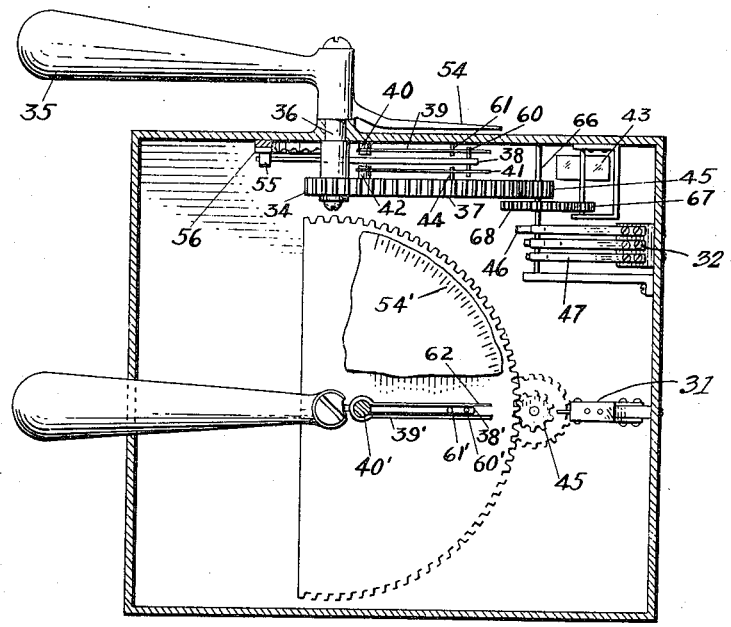
Fig. 3.
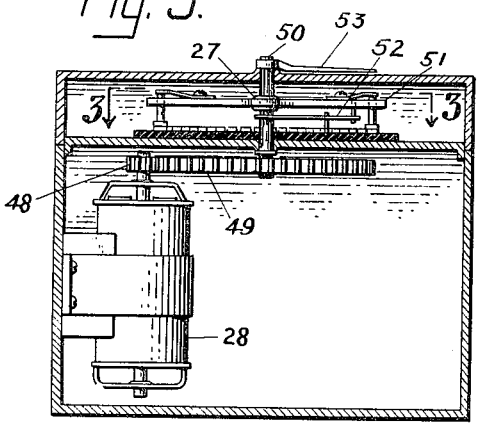
Fig. 4.
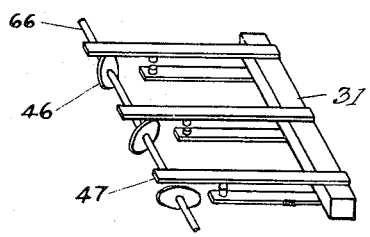
Fig. 5.
Fig. 6.
INVENTOR
ARTHUR P. DAVIS.
BY
Herbert H. Thompson
ATTORNEY Patented Sept. 1, 1925.

1,551,805

UNITED STATES PATENT OFFICE.

ARTHUR P. DAVIS, OF BROOKLYN, NEW YORK, ASSIGNOR TO ELMER A. SPERRY, OF BROOKLYN, NEW YORK.

DISTANT CONTROL FOR SEARCHLIGHTS.

Application filed January 4, 1917. Serial No. 140,653.

*To all whom it may concern:*

Be it known that I, ARTHUR P. DAVIS, a citizen of the United States of America, residing at 3049 Ocean Avenue, Brooklyn, in the county of Kings and State of New York, have invented certain new and useful Improvements in Distant Controls for Searchlights, of which the following is a specification.

This invention relates to a distant control system for searchlights, guns and other ordnance appliances. The present systems for elevating and training searchlights from a distance cause the light to move by jerks or steps, each step representing a movement of the beam of light through a given number of degrees or minutes of arc. With such systems, it is impossible, without a vast number of wires leading from the control station to the light, to place or keep the beam on an object which may lie between certain fixed points, especially if the object be at a great distance from the searchlight. And if a ship is moving in front of the light, it is impossible to keep the light pointing directly at the ship, the beam apparently varying continually from a point a little in front of to a point a little behind the ship.

The purpose of my invention is to overcome these objections, and to produce a system whereby it will be possible to train or elevate the light without any jerking or vibrating, and to be able to fix the light on any point within its radius. I accomplish this by causing the light to move steadily in the direction or directions desired and by controlling the speed at which it moves, and stopping it at any desired point.

Referring to the drawings in which what I now consider to be the preferred form of my invention are shown.

Figure 2:
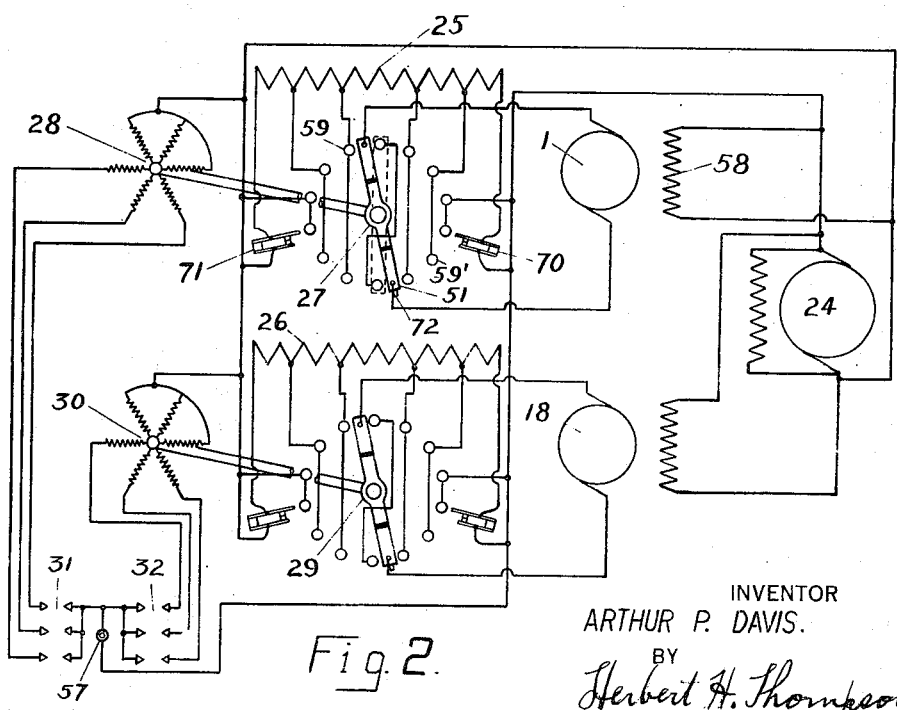

Fig. 1 is an assembly of the searchlight unit, showing the manner in which the elevating and training motors operate. Fig. 2 is a wiring diagram of the entire system. Fig. 3 is a side elevation with part of the case removed, of the transmitter. Fig. 4 is a side elevation with part of the case removed, of the selector switch and repeater unit. Fig. 5 is a top elevation of the selector switch. Fig. 6 is a diagrammatic view of the contacts in the transmitter.

The elevating motor is shown at 1 and is preferably located within the base 2 and securely fastened to the revolving part 3 thereof by means of bracket 4. Said motor is connected with driving rod 5 by means of worm 6, worm wheel 7, shaft 8 and universal joint 9. Additional reduction gears may be inserted between the motor and driving rod if desired. At the top of rod 5, on the slidable sleeve 10 is fastened pinion 11 capable of being slid into or out of mesh with the crown gear 12. On the same shaft with crown gear 12 is mounted pinion 13 meshing with segmental gear 14 secured to the drum 15. In order to elevate the drum by hand, pinion 11 may be slid out of mesh with crown gear 12 by means of arm 16, thus permitting the drum to be elevated by means such as crank 17.

The training motor is shown at 18, secured to the inside of the stationary portion 19 of the base by means such as bracket 20, and is geared to the revolving portion 3 of the base by means of the crown gear 21 secured to said base portion 3 and pinion 22 slidably mounted on the shaft of said training motor. Pinion 22 may be slid out of mesh with gear 21 by means of rod 23. The gear 21 may extend around the entire circumference of the base so as to permit the light to be turned completely around.

In the wiring diagram shown in Fig. 2 the source of current is shown at 24, the elevating motor at 1 and the training motor at 18. The resistance for the elevating motor is shown at 25 and the training motor resistance at 26. 27 is a selector switch used to shunt the desired portions of the resistance with the elevating motor armature, and 28 is a repeater motor used to actuate the selector switch for said motor. 29 and 30 are corresponding switch and repeater motor respectively, for the training motor. The transmitters for the elevating and training motors are shown at 31 and 32 respectively.

The field winding 58 of motor 1 is connected directly across the main feed lines, while the armature may be placed in shunt with the desired number of coils of resistance 25.

It will be readily understood that when the switch bar 51 is in the dotted line position, thus short circuiting the armature which is preferably of low resistance, of the driving motor, a braking torque will be produced which will bring it to a quick stop if it is turning. To start the motor the switch may be moved into contact with the first set of points 59 and 59', thus placing the armature in shunt with a small part of the resistance 25. It will be seen that, as the resistance of the armature is very low as compared with that of the rheostat, a considerable part of the current passing across that part of the rheostat placed in shunt will be diverted through the armature and cause the motor to start. The voltage drop through the armature and shunted part of the resistance together will now be less than that which was originally caused through that part of the rheostat alone. The speed of the motor will then increase rapidly and very steadily owing to the great torque produced, until the drop attains its original value. The speed of the motor will then remain constant, and the searchlight will be caused to turn at a smooth and constant speed.

To increase the speed, the switch may be advanced a point to place in shunt a larger part of the resistance. In order to avoid mechanical shock and to insure a smooth picking up of speed, I may provide a suitable fly wheel 60ª on the shaft of either of the motors, although I have shown but one such wheel to avoid unnecessarily complicating the drawings.

When the motor is working at its maximum speed with its armature connected directly across the line, I desire to cut out the resistance. For this purpose I may provide spring pressed contacts 70 and 71 which are normally closed, but are opened by the pressure of the extension 72 on the switch when the switch is placed across the line. Any suitable size resistance may be employed, and any desired number of contact points provided on the selector switch, so that a great range of speeds may be attained with any suitable difference between each succeeding speed.

I prefer to provide a range of speeds from that sufficient to follow a distant target moving very slowly across the horizon, to that capable of tracing a swiftly moving airship reasonably near the searchlight.

In order to stop the moving searchlight, the switch may be turned back to the central or dotted line position, or simply released and allowed to turn back automatically. This will short circuit the armature and brake the motor, causing it to stop.

It should also be noted that braking of the armature does not begin or take place only when short circuited, but takes place at each downward step of the selector switch. This is produced by the dissipating of energy stored in the rotating armature as heat in the resistance, or in other words, by a regenerative action of the motor which takes place whenever the counter E. M. F. of the motor exceeds the normal voltage drop across that part of the resistance with which the armature is shunted. This situation will exist the moment the amount of resistance in shunt is reduced. It will be seen from this that, when the motor is running at a given speed, the return of the selector switch to its central position will shunt successively smaller amounts of resistance. Deceleration of the motor will thus take place as rapidly as the transmitter returns to neutral point, with the result that when the armature is finally short circuited it will be brought to a dead stop without any jolting. The advantage of this method of controlling a searchlight is that it may be brought from any operating speed to a very quick and smooth stop.

If the operator is engaged in searching a given field, he will naturally be moving the light very slowly so that the selector switch will not be far from the central position. In such a position the time consumed between the releasing of the switch and the actual stopping of the light is but a fraction of a second, so that if an object is picked up the light may be stopped before the beam passes beyond the object.

To reverse the motor, the switch may be turned in the oposite direction, thus reversing the flow of current through the armature. The same range of speeds may be provided to turn the light in either direction.

The transmitter unit which may be placed at any desired distance from the searchlight is connected to the repeater motors which may be located near the light and to the source of current by means of only a few wires. The elevating and training transmitters may both be placed in one case as shown in Fig. 3, in which the transmitter 31 may be used for elevating and 32 for training. The two transmitters may be of similar construction.

The handle 35 is rigidly mounted on the shaft 36, while the segmental gear 37 is loosely mounted thereon. Segmental gear 37 meshes with pinion 45 on shaft 66, upon which shaft is also mounted the rotary part of the transmitter. This may comprise a plurality of cams 46 which serve to make and break the contacts 47 which energize the fields of the repeater motor.

When the handle 35 is turned rod 38 rigidly attached thereto will turn also and carry with it the centralizing spring 39, or a similar spring on the opposite side not shown, by means of pin 60 fastened to said rod 38. These springs are wrapped around and fastened to peg 40 rigidly secured to the casing. When either of said springs is turned, the opposite one will press against pin 61 fastened to the casing. This will cause the handle to return to its central position when it is released.

The manner in which these springs operate to centralize the handle may be more clearly seen by examining the corresponding springs in the training motor control, in which spring 39' corresponds to spring 39 and spring 62 to the opposite spring not shown in the elevating transmitter. Rod 38' corresponds to 38 and peg 40' to peg 40, while pins 60' and 61' correspond to 60 and 61 respectively.

Similar springs 41 are fastened to peg 42 on gear 37. The turning of the rod 38 carries with it springs 41 which in turn cause gear 37 to follow. If the handle is turned at a reasonable speed, gear 37 will turn with the same rate of speed. But if the handle is turned too rapidly, the springs will yield and allow the gear to lag. The gear will, however, continue to follow until the pin 44 strikes the spring; sufficient initial strain being provided in the spring to prevent the gear from being stopped by friction or other slight causes before reaching its destination.

The reason for causing or allowing gear 37 to lag when the transmitter handle is turned faster than a predetermined speed, is to avoid advancing of the steps of the transmitter faster than the repeater motor can follow, and thus to prevent said repeater motor from losing step.

In order to insure the retarding of the speed of gear 37 I prefer to employ a fan 43 connected by means of gears 67 and 68 to shaft 66, to act as a governor. It should be understood, however, that while I retard the motion of the transmitter, I do not do so to such a degree as to destroy the operator's ability to control the light with practically instantaneous response, as it is not necessary to retard the transmitter more than a mere fraction of a second.

In Fig. 4 I show the type of selector switch which I prefer to use, and the manner in which it may be operated by the repeater motor. The repeater motor 28 is coupled to the selector switch 27 by means of pinion 48, gear 49 and shaft 50. It will be seen that the turning of the repeater motor will cause the arm 51 of the switch to turn. In order that the arm 51 may always return to the central position when the repeater motor is de-energized, I may provide centralizing springs 52 and 52'. The manner in which these springs operate is similar to the centralizing springs described in connection with the transmitter.

An important advantage of the provision for the centralizing of the switch is that, if through any cause, the repeater motor becomes out of step with the transmitter, so that when the transmitter returns to its central or neutral position the switch will be held in a position other than central, I may by breaking the circuit through the repeater motor allow the switch to centralize itself. To break the circuit I may provide a switch 57 in the common return circuit.

In order that the operator may know when the switch brushes are resting squarely over the contact points, I may provide, attached to the controller handle, a lug or trolley 55, which may pass lightly in and out of notches 56 secured to the casing, each notch indicating that the switch is centrally over a set of contact points.

In order that the operator may know what rate of speed he is operating at, a pointer 54 may be connected to the transmitter by attaching said pointer to the controller handle and which pointer will operate over some suitable scale, such as is shown at 54'. Similar indicating means 53 may be provided on the selector switch casing to indicate the position of the switch within.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with an object, of a motor connected thereto for turning the same, a resistance element, a movable member connected to the armature of said motor independently of said resistance, means including said member for connecting said armature across different intermediate portions of said resistance, and a synchronous transmission system for controlling said movable member from a distance.

2. A system for controlling the speed and direction of rotation of a motor from a distance comprising a resistance element at the controlled station, a switch connected to said motor independently of said element, means arranged to be engaged by said switch for connecting said motor across different portions of said element and for disconnecting said motor from said element. a repeater motor connected to said switch, and a transmitter connected to said repeater motor.

3. The combination with an object, of a motor connected thereto for turning the same, a resistance element, means including a movable member connected to said motor independently of said element for connecting said motor across different portions of said element and for disconnecting said motor from said element, and a step-by-step transmission system for controlling said movable member from a distance.

4. In a distant control system for searchlights, a transmitter, a repeater motor actuated thereby, a resistance, a drive motor controlled through said resistance connected to said light to turn the same, a selector switch operated by said repeater motor for varying the connections between said resistance and said drive motor, means to stop said light at any desired point, and means for returning the selector switch to its starting point without returning the searchlight.

5. In a distant control system for searchlights. a controller, a transmitter associated therewith, a repeater motor actuated by said transmitter, means for absorbing too rapid motion of said transmitter to prevent the same from stepping ahead of said repeater motor, and for transmitting said absorbed motion to the repeater motor, a resistance normally connected across the line, a drive motor having its field continuously connected across the line and its armature shunted with part of the aforesaid resistance, a selector switch operated by the aforesaid repeater motor to vary the connections of said armature with said resistance, means for centralizing said selector switch when the repeater motor is de-energized and means for de-energizing said repeater motor.

6. In combination with a searchlight, a motor for turning said light, a resistance shunted with the armature of said turning motor, a selector switch for varying the connections between said resistance and said armature, and for breaking the connection between said armature and said resistance, a repeater motor for operating said selector switch, a transmitter for actuating said repeater motor and means for preventing loss of synchronism between said transmitter and said repeater motor.

7. In combination, a speed controlling device, an actuating device adapted to control the position of said speed controlling device from a distance, connections between said devices for causing the first mentioned device to assume constantly a position in accordance with the position of said second mentioned device and means for restoring said devices to a predetermined relationship after such relationship has been disturbed, said means being operable at a point adjacent the actuating device.

8. In a distant control system for searchlights, a transmitter, a repeater motor actuated thereby, a resistance, a drive motor having an armature in parallel with said resistance and connected to said light to turn the same, a selector switch operated by said repeater motor for varying the connections between said resistance and said drive motor, and means to prevent said repeater motor from losing step by too rapid movement of the transmitter.

In testimony whereof I have affixed my signature.

ARTHUR P. DAVIS.